(12) United States Patent
Hama et al.

(10) Patent No.: US 8,684,127 B2
(45) Date of Patent: Apr. 1, 2014

(54) ELECTRIC POWER STEERING SYSTEM (75) Inventors: Takeshi Hama, Okazaki (JP); Yutaka Nagahashi, Toyota (JP)

(73) Assignee: JTEKT Corporation, Osaka (JP)

( * ) Notice: Subject to any disclaimer, the term of this patent is extended or adjusted under 35 U.S.C. 154(b) by 13 days.

(21) Appl. No.: 13/639,225

(22) PCT Filed: Apr. 8, 2011

(86) PCT No.: PCT/JP2011/058916
§ 371 (c)(1),
(2), (4) Date: Oct. 4, 2012

(87) PCT Pub. No.: WO2011/129280
PCT Pub. Date: Oct. 20, 2011

(65) Prior Publication Data
US 2013/0025960 A1   Jan. 31, 2013

(30) Foreign Application Priority Data

Apr. 13, 2010 (JP) ................................. 2010-092476

(51) Int. Cl.
*B62D 5/04* (2006.01)
*F16D 1/10* (2006.01)
*F16H 1/16* (2006.01)

(52) U.S. Cl.
CPC .............. *B62D 5/0409* (2013.01); *F16D 1/101* (2013.01); *F16H 1/16* (2013.01); *F16D 2001/102* (2013.01)
USPC ....................................................... 180/444

(58) Field of Classification Search
CPC . B62D 5/0409; F16D 1/101; F16D 2001/102; F16H 1/16
See application file for complete search history.

(56) References Cited

U.S. PATENT DOCUMENTS

| | | | | |
|---|---|---|---|---|
| 6,763,738 | B1 * | 7/2004 | Tsutsui et al. ............ | 74/388 PS |
| 7,188,700 | B2 * | 3/2007 | Eda et al. ....................... | 180/444 |
| 7,213,677 | B2 * | 5/2007 | Nakamura et al. ............ | 180/444 |
| 2002/0017420 | A1 | 2/2002 | Kinme et al. | |
| 2003/0146039 | A1 | 8/2003 | Sano et al. | |

FOREIGN PATENT DOCUMENTS

| | | |
|---|---|---|
| JP | U-63-131571 | 8/1988 |
| JP | A-2002-37094 | 2/2002 |
| JP | A-2003-291828 | 10/2003 |
| JP | A-2004-90811 | 3/2004 |
| JP | A-2006-111133 | 4/2006 |
| JP | 2012086799 A * | 5/2012 |

OTHER PUBLICATIONS

International Search Report issued in International Patent Application No. PCT/JP2011/058916 mailed Jun. 7, 2011.

* cited by examiner

*Primary Examiner* — Kevin Hurley
(74) *Attorney, Agent, or Firm* — Oliff PLC (57) ABSTRACT

An electric power steering system includes a shaft coupling that drivably couples a worm gear to an output shaft such that the worm gear is tiltable with respect to the output shaft. The shaft coupling includes a fixing part coupled to the output shaft and a cylindrical part having an inner periphery in rectangular cross section and fixed to the fixing part. A coupling part that is inserted in the cylindrical part and that has an outer periphery in non-circular cross section, engageable with the inner periphery, is formed at a proximal end part of the worm gear, and the outer periphery is ridged such that gaps that allow the coupling part to tilt are provided inside the cylindrical part. Then, the cylindrical part presses an inner ring of the first rolling bearing toward an axially distal end side of the worm gear.

6 Claims, 7 Drawing Sheets

ELECTRIC POWER STEERING SYSTEM

TECHNICAL FIELD

The invention relates to an electric power steering system.

BACKGROUND ART

Conventionally, there is an electric power steering system (EPS) that applies assist force for assisting steering operation to a steering system by driving a steering shaft for rotation with the use of a motor as a driving source. Generally, the EPS includes a speed reducing mechanism that is formed such that a worm gear to be rotated by the motor and a wheel gear coupled to the steering shaft are in mesh with each other. Then, the torque of the motor is transmitted to the steering shaft via the speed reducing mechanism.

In the case of the EPS that employs the above described speed reducing mechanism, it is an important element to set and keep a meshing state of the above gears, that is, an appropriate center distance at the meshing parts of the worm gear and wheel gear. Specifically, as the center distance reduces, it is possible to suppress generation of noise and vibration; conversely, abrasion of the gears easily advances. On the other hand, when the center distance is large, it is possible to suppress abrasion; however, noise and vibration tend to be easily generated. Therefore, it is desirable that the center distance of the gears is set within a range that is considered to be optimal in consideration of a balance between the gears and is stably kept irrespective of a secular change, such as abrasion of a tooth flank.

In many cases, a so-called anti-backlash system is incorporated in the EPS. The anti-backlash system supports the worm gear via a shaft coupling such that the worm gear is tiltable with respect to an output shaft of the motor, and keeps the optimal center distance between the worm gear and the wheel gear by pressing the worm gear in a direction to get close to the wheel gear. For example, see Patent Document 1.

Figure 9:
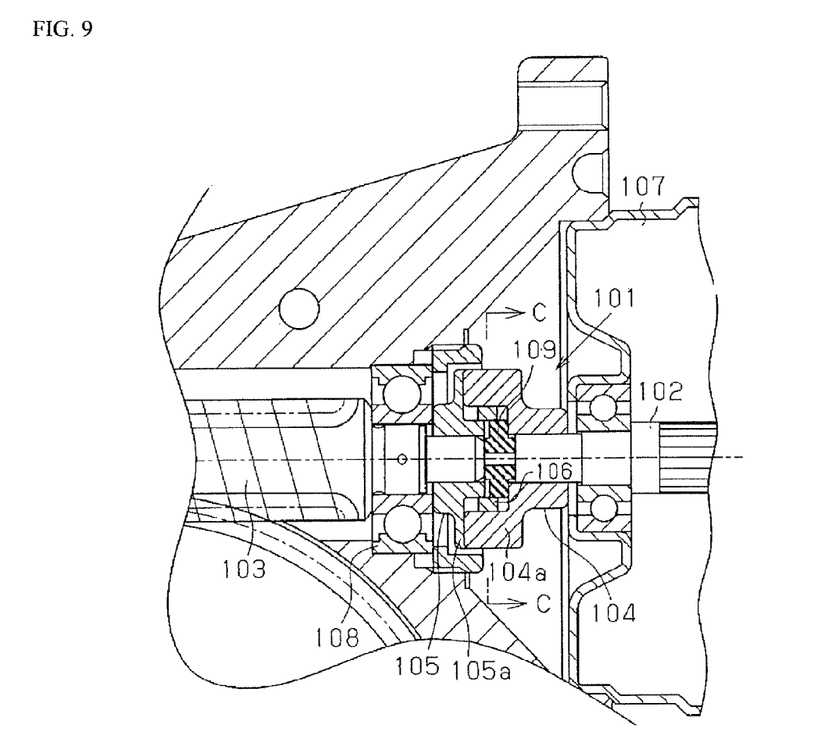
FIG. 9 is a partially sectional view that shows the schematic configuration of a conventional EPS actuator.
Figure 10:
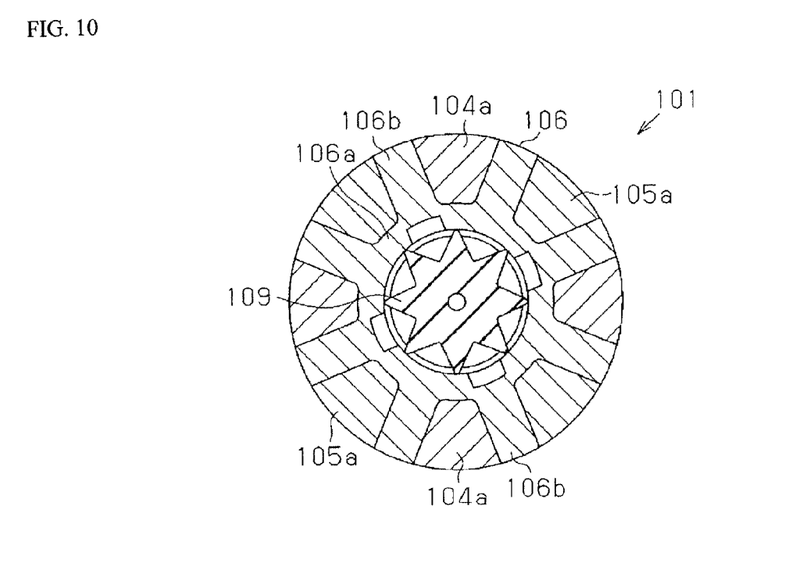
FIG. 10 is a sectional view taken along the line C-C in FIG. 9.

As shown in FIG. 9, such a shaft coupling 101 includes a pair of flange bosses 104 and 105 respectively coupled to an output shaft 102 and a worm gear 103 and a rubber spring 106 made of an elastic material and held between these flange bosses 104 and 105. The flange bosses 104 and 105 each are formed in substantially an annular shape, and respectively have a plurality of engaging pawls 104a and a plurality of engaging pawls 105a, protruding in mutually opposite directions. As shown in FIG. 10, these engaging pawls 104a and 105a are alternately arranged in the circumferential direction. In addition, the rubber spring 106 is fainted of an annular base part 106a and engaging parts 106b that extend radially outward from the base part 106a and each of which is held between the adjacent engaging pawls 104a and 105a. Then, the shaft coupling 101 is configured to allow tilting of the worm gear 103 with respect to the output shaft 102 through elastic deformation of the rubber spring 106.

On the other hand, as shown in FIG. 9, in a rolling bearing 108 that supports a proximal end part of the worm gear 103, adjacent to a motor 107, such that the proximal end part is rotatable, a predetermined internal gap (backlash) is formed between an inner ring, an outer ring and rolling elements (balls) in order to allow tilting of the worm gear 103, so there is a possibility that noise occurs due to vibration, or the like, caused by the travelling of the vehicle. Then, the shaft coupling 101 includes a spacer 109 that is interposed between the output shaft 102 and the worm gear 103, and suppresses generation of noise as in the following manner. The spacer 109 presses the worm gear 103 toward an axially distal end side (left side in FIG. 9) to apply preload to the rolling bearing 108, thus filling the internal gap.

PRIOR ART DOCUMENT

Patent Document

Patent Document 1: Japanese Patent Application Publication No. 2006-111133

SUMMARY OF THE INVENTION

Problem to be Solved by the Invention

However, with the above described conventional configuration, the number of components that constitute the shaft coupling 101 is large, so the configuration is complex. In addition, the pair of flange bosses 104 and 105, the rubber spring 106 and the spacer 109 that constitute the shaft coupling 101 are present as separate components in a state before assembling, that is, the components are separate, so assembling work tends to be complicated. In terms of this point, there is still room for improvement.

The invention is contemplated to solve the above problem, and it is an object of the invention to provide an electric power steering system that is able to keep an appropriate center distance between a worm gear and a wheel gear while suppressing generation of noise with a simple configuration.

Means for Solving the Problem

An aspect of the invention provides an electric power steering system. The electric power steering system includes: a motor that applies assist force for assisting steering operation to a steering system; a speed reducing mechanism that is formed such that a worm gear to be rotated by the motor is meshed with a wheel gear coupled to the steering shaft; and a shaft coupling that drivably couples the worm gear to an output shaft of the motor such that the worm gear is tiltable with respect to the output shaft, wherein a proximal end part of the worm gear, adjacent to the motor, is supported by a first rolling bearing, a distal end part of the worm gear is supported by a second rolling bearing that is provided so as to be movable in a direction to approach to or distance from the wheel gear, and the second rolling bearing is urged by urging means so as to get close to the wheel gear. In the electric power steering system, the shaft coupling includes a fixing part coupled to the output shaft so as to be integrally rotatable and a cylindrical part having an inner periphery in non-circular cross section and fixed to the fixing part, a coupling part having an outer periphery in non-circular cross section, the outer periphery being inserted in the cylindrical part and being engageable with the inner periphery in a circumferential direction, is formed in the proximal end part, any one of the inner periphery and the outer periphery is ridged such that a gap that allows the coupling part to tilt is provided inside the cylindrical part, and the cylindrical part presses an inner ring of the first rolling bearing toward an axially distal end side of the worm gear.

With the above configuration, the fixing part of the shaft coupling and the output shaft of the motor are provided so as to be integrally rotatable, and the coupling part of the worm gear inserted in the cylindrical part is engaged with the cylindrical part in the circumferential direction, so the torque of the motor is transmitted to the worm gear via the shaft coupling. In addition, any one of the inner periphery of the cylindrical part and the outer periphery of the coupling part is ridged such that the gap that allows the proximal end part to tilt is provided inside the cylindrical part, so the worm gear is able to tilt with respect to the output shaft due to the shaft coupling, and it is possible to keep an optimal center distance between the worm gear and the wheel gear. In addition, the inner ring of the first rolling bearing is pressed toward the axially distal end side of the worm gear by the cylindrical part. By so doing, the internal gap of the first rolling bearing is filled, so it is possible to suppress generation of noise. Then, because the cylindrical part is fixed to the fixing part and the shaft coupling is formed as one component, in comparison with the case where a shaft coupling is formed of a plurality of components that are separated in a state before assembling as in the case of the conventional art, the shaft coupling may be formed with a simple configuration, and it is possible to improve its assemblability.

In the electric power steering system according to the above aspect, the cylindrical part may be formed of an elastic material. Significantly large torque may act from the wheel gear on the worm gear through application of reverse input, for example, a collision of the steered wheel of the vehicle with a curb. However, the worm gear cannot immediately rotate due to the inertia (inertia) of the motor, so there is a possibility that a large load acts on the meshing part with the wheel gear through application of reverse input. In terms of this point, with the above configuration, the cylindrical part is formed of an elastic material, so, even when significantly large torque acts from the wheel gear on the worm gear through application of reverse input, the cylindrical part elastically deforms so as to twist. By so doing, it is possible to suppress large torque that acts on the meshing part with the wheel gear.

In the electric power steering system according to the above aspect, a cavity-shaped lightening part may be formed in the cylindrical part between opposite faces of the fixing part and the inner ring of the first rolling bearing in the cylindrical part.

When the elastic modulus of the elastic material that forms the cylindrical part is high, a preload on the inner ring of the first rolling bearing significantly varies depending on the assembling accuracy, or the like, of the shaft coupling, so it is desirable to decrease the elastic modulus in view of adjusting the preload. On the other hand, when the elastic modulus is low, there is a possibility that the cylindrical part is elastically deformed by torque transmitted from the output shaft of the motor to the worm gear, and there occurs a problem, such as a delay of torque transmission, so it is desirable to increase the elastic modulus in view of torque transmission.

With the above configuration, the cavity-shaped lightening part is formed in the cylindrical part between the opposite faces of the fixing part and the inner ring of the first rolling bearing, so the cylindrical part easily deforms along the axial direction, and it is possible to easily adjust the preload. Thus, even when a material having a high elastic modulus is used for the cylindrical part, it is possible to easily adjust the preload, and it is possible to suppress a delay of torque transmission.

In the electric power steering system according to the above aspect, the lightening part may be formed in a groove shape that is open at a bonding face of the cylindrical part with the fixing part.

With the above configuration, because the lightening part is formed in a groove shape that is open at the bonding face of the cylindrical part with the fixing part, in comparison with the case where the lightening part is formed in a groove shape that is open to the outer periphery of the cylindrical part, it is possible not to reduce the thickness of the cylindrical part.

Thus, easy twisting of the cylindrical part is suppressed by forming the lightening part, so it is possible to suppress a delay of torque transmission.

In the electric power steering system according to the above aspect, a reinforcement part that is in plane contact with the inner periphery and that is engageable with the outer periphery in the circumferential direction may be provided at the cylindrical part, and the reinforcement part may be made of a resin material having a higher elastic modulus than the cylindrical part.

Because the outer periphery of the coupling part is ridged, the outer periphery is in line contact with the inner periphery of the cylindrical part. Thus, when the outer periphery directly engages the inner periphery, large force locally acts from the outer periphery of the coupling part on the inner periphery when the torque of the motor is transmitted. By so doing, the cylindrical part easily deforms, and there is a possibility that a delay of torque transmission slightly occurs.

With the above configuration, because the reinforcement part is provided at the cylindrical part, the outer periphery engages the inner periphery via the reinforcement part. Then, because the reinforcement part is formed of a resin material having a higher elastic modulus than the cylindrical part, the reinforcement part is hard to deform when the torque of the motor is transmitted. In addition, because the reinforcement part is in plane contact with the inner periphery of the cylindrical part, large force does not act on the inner periphery, so the cylindrical part is hard to deform, and it is possible to suppress occurrence of a delay of torque transmission.

In the electric power steering system according to the above aspect, the cylindrical part may include an inner peripheral part made of a metal material and having the inner periphery in non-circular cross section and an outer peripheral part made of an elastic material and pressing the inner ring of the first rolling bearing toward the axially distal end side of the worm gear, and the fixing part may be made of a metal material and may be integrally formed with the inner peripheral part.

With the above configuration, because the inner peripheral part of the cylindrical part and the fixing part are integrally formed of a metal material, it is possible to transmit the torque of the motor to the worm gear without delay.

Advantageous Effect of the Invention

According to the invention, It is possible to provide an electric power steering system that is able to keep an optimal center distance between a worm gear and a wheel gear while suppressing generation of noise with a simple configuration.

MODES FOR CARRYING OUT THE INVENTION

Figure 1:
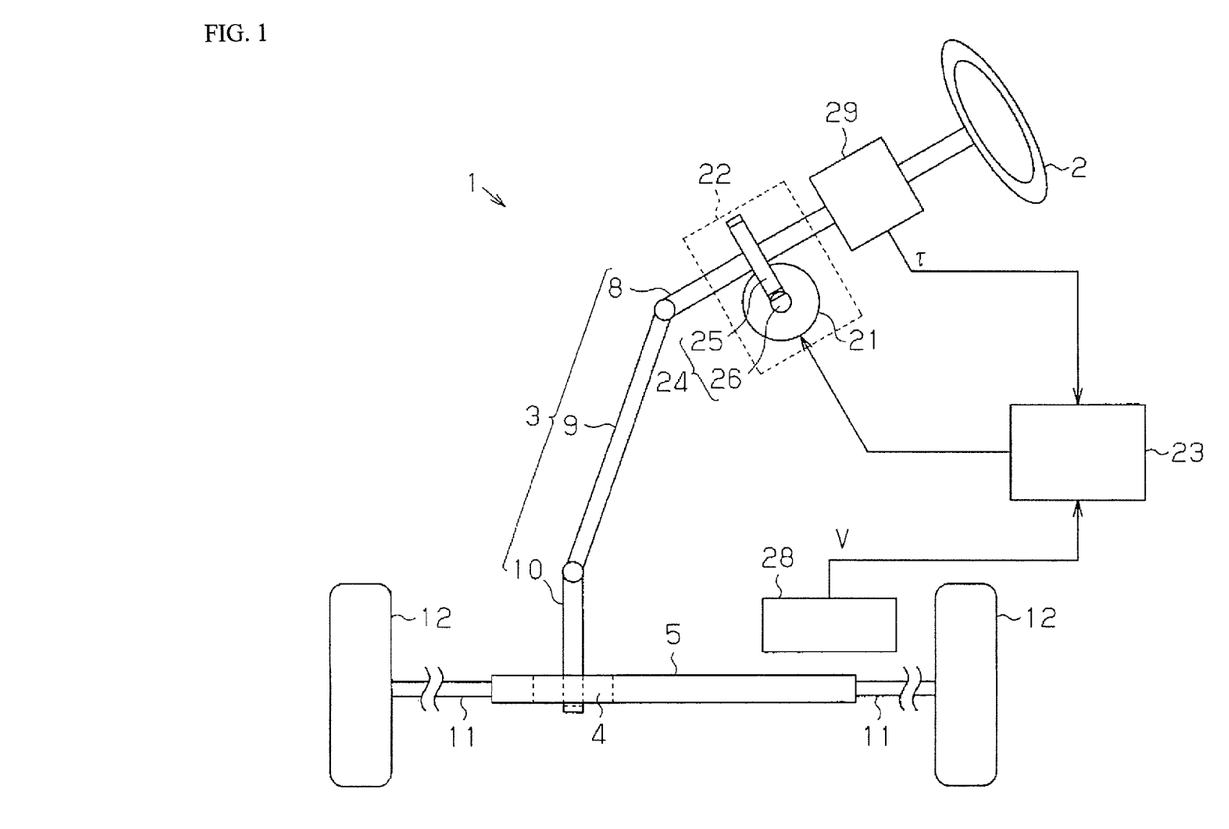
FIG. 1 is a schematic configuration diagram of an electric power steering system (EPS).

An embodiment of the invention will be described with reference to the drawings. As shown in FIG. 1, in an electric power steering system (EPS) 1, a steering shaft 3 to which a steering wheel 2 is fixed is coupled to a rack shaft 5 via a rack-and-pinion mechanism 4. By so doing, the rotation of the steering shaft 3 resulting from steering operation is converted into the reciprocal linear motion of the rack shaft 5 by the rack-and-pinion mechanism 4. Note that the steering shaft 3 is formed by coupling a column shaft 8, an intermediate shaft 9 and a pinion shaft 10. Then, the reciprocating linear motion of the rack shaft 5 resulting from the rotation of the steering shaft 3 is transmitted to knuckles (not shown) via tie rods 11 coupled to both ends of the rack shaft 5. By so doing, the turning angle of steered wheels 12, that is, the travelling direction of the vehicle, is changed.

The EPS 1 includes an EPS actuator 22 and an ECU 23. The EPS actuator 22 applies assist force for assisting steering operation to a steering system with the use of a motor 21 as a driving source. The ECU 23 controls operation of the EPS actuator 22.

The EPS actuator 22 is configured as a so-called column-type EPS actuator. Specifically, the motor 21 that is the driving source of the EPS actuator 22 is drivably coupled to the column shaft 8 via a speed reducing mechanism 24. The speed reducing mechanism 24 is configured such that a wheel gear 25 coupled to the column shaft 8 is in mesh with a worm gear 26 coupled to the motor 21. Then, the speed of rotation of the motor 21 is reduced by the speed reducing mechanism 24, and the rotation is transmitted to the column shaft 8 by the speed reducing mechanism 24. By so doing, motor torque is applied to the steering system as assist force.

A vehicle speed sensor 28 and a torque sensor 29 are connected to the ECU 23. Then, the ECU 23 is configured to operate the EPS actuator 22, that is, execute control over assist force applied to the steering system, on the basis of a vehicle speed V and a steering torque T that are respectively detected by these sensors.

Figure 2:
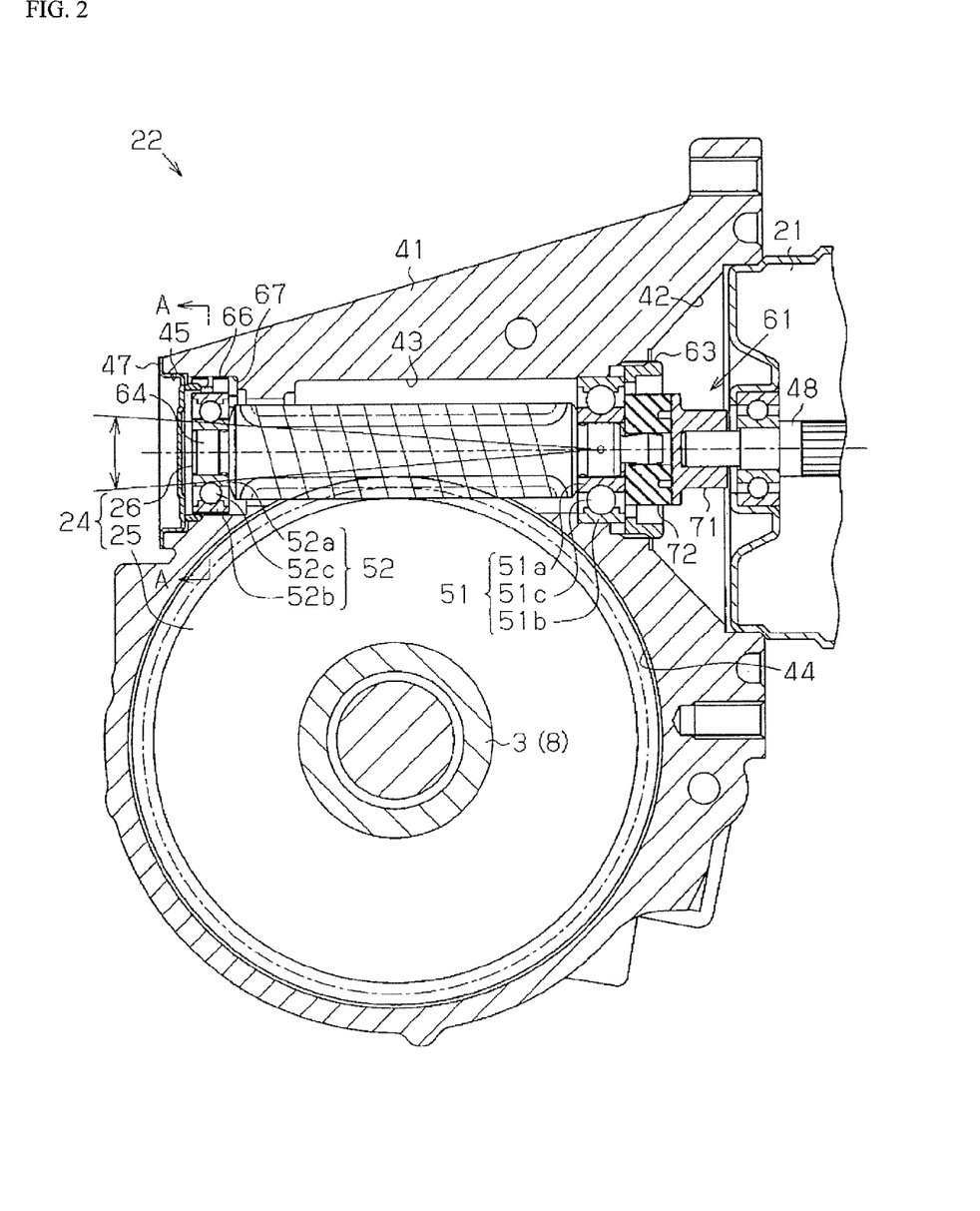
FIG. 2 is a sectional view that shows the schematic configuration of an EPS actuator according to a present embodiment.

Next, the configuration of the EPS actuator according to the present embodiment will be described. As shown in FIG. 2, the EPS actuator 22 includes a housing 41 that accommodates the speed reducing mechanism 24. The housing 41 has a motor housing part 42 of the motor unit, a worm gear housing part 43 and a wheel gear housing part 44. Part of the motor 21 is accommodated in the motor housing part 42. The worm gear housing part 43 is formed continuously with the motor housing part 42. The worm gear 26 is accommodated in the worm gear housing part 43. The wheel gear housing part 44 is formed continuously with the worm gear housing part 43. The wheel gear 25 is accommodated in the wheel gear housing part 44. In addition, an opening part 45 having a substantially circular opening is formed in the worm gear housing part 43 at the distal end side (left side in FIG. 2) of the worm gear 26. Then, the opening part 45 is closed by an end cover 47.

The motor 21 is fixed to the housing 41 in such an arrangement that the axial direction of the output shaft 48 is perpendicular to the axial direction of the steering shaft 3 (column shaft 8) that extends through the housing 41. Both ends of the worm gear 26 coupled to the output shaft 48 are respectively rotatably supported by first and second rolling bearings 51 and 52 provided in the housing 41. The worm gear 26 is in mesh with the wheel gear 25 coupled to the steering shaft 3. Note that, in the present embodiment, ball bearings are employed as these first and second rolling bearings 51 and 52, and the first and second rolling bearings 51 and 52 are respectively formed of inner rings 51a and 52a, outer rings 51b and 52b and balls 51c and 52c.

A so-called anti-backlash system is incorporated in the EPS actuator 22. The anti-backlash system is used to keep an appropriate center distance at meshing parts of the wheel gear 25 and the worm gear 26 that constitute the speed reducing mechanism 24.

More specifically, the worm gear 26 is coupled by a shaft coupling 61 so as to be tiltable with respect to the output shaft 48 of the motor 21. In addition, the first rolling bearing 51 that supports a proximal end part 62 (right end in FIG. 2) of the worm gear 26 is inserted from the proximal end side of the worm gear housing part 43. Then, the first rolling bearing 51 is fixed in a state where axial movement is restricted with respect to the housing 41 in the following manner. One end of the outer ring 51b contacts the housing 41, and the other end of the outer ring 51b contacts a fixing member 63 fixed to the other end in the worm gear housing part 43.

The second rolling bearing 52 that supports a distal end part 64 (left end in FIG. 2) of the worm gear 26 is provided inside the worm gear housing part 43 of the housing 41 so as to be movable in a direction to approach to or distance from the wheel gear 25 (vertical direction in FIG. 2). Then, the second rolling bearing 52 is urged in a direction to get close to the wheel gear 25 by the elastic force of a curved leaf spring 66 that serves as urging means curved to surround the outer periphery of the second rolling bearing 52.

A support part 67 is formed in the worm gear housing part 43 at a position continuous with the opening part 45. The support part 67 is used to accommodate and support the second rolling bearing 52 and the curved leaf spring 66. The bore diameter of the support part 67 is set so as to be larger than the outside diameter of the second rolling bearing 52. By so doing, the second rolling bearing 52 is movable in a direction to approach to or distance from the wheel gear 25 inside the support part 67.

Figure 3:
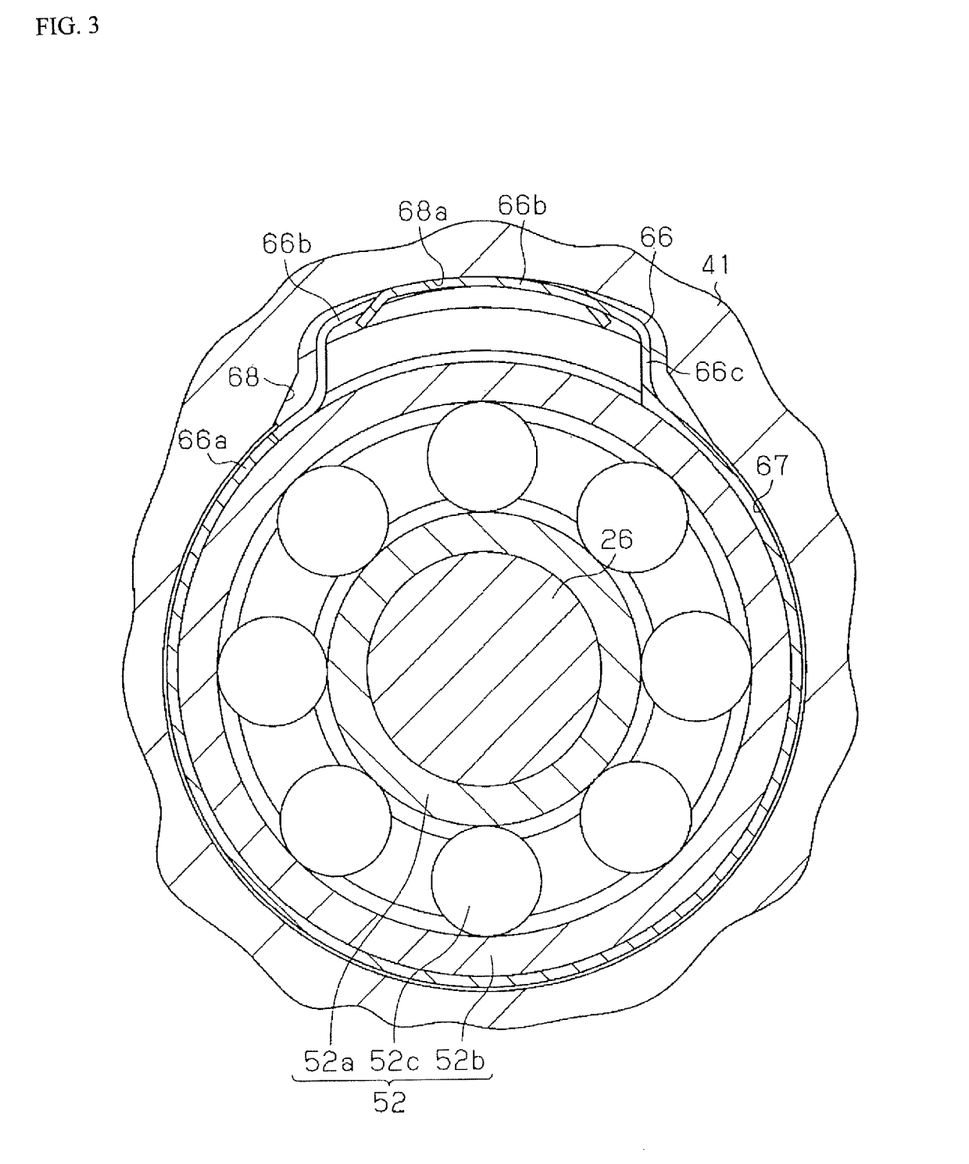
FIG. 3 is a sectional view taken along the line A-A in FIG. 2.

As shown in FIG. 3, the curved leaf spring 66 is formed of an arcuate arc part 66a, a spring part 66b and a connecting part 66c. The arc part 66a contacts the outer ring 52b of the second rolling bearing 52. The spring part 66b is arranged radially outward of the arc part 66a. The connecting part 66c connects both ends of these spring part 66b and arc part 66a. Then, after the second rolling bearing 52 is inserted in the support part 67, the curved leaf spring 66 is inserted onto the outer periphery of the second rolling bearing 52.

An housing recess 68 is formed on the peripheral wall of the support part 67 on an opposite side (upper side in FIG. 3) with respect to the wheel gear 25 (see FIG. 2). The housing recess 68 accommodates the spring part 66b of the curved leaf spring 66 that is deflected at the time of the above insertion. The spring part 66b contacts a bottom face 68a of the housing recess 68 to press the bottom face 68a. By so doing, the second rolling bearing 52 is urged in a direction to get close to the wheel gear 25 (lower side in FIG. 3). By so doing, as shown in FIG. 2, the worm gear 26 tilts about its proximal end side, and an optimal center distance is kept between the worm gear 26 and the wheel gear 25 at their meshing parts.

Figure 4:
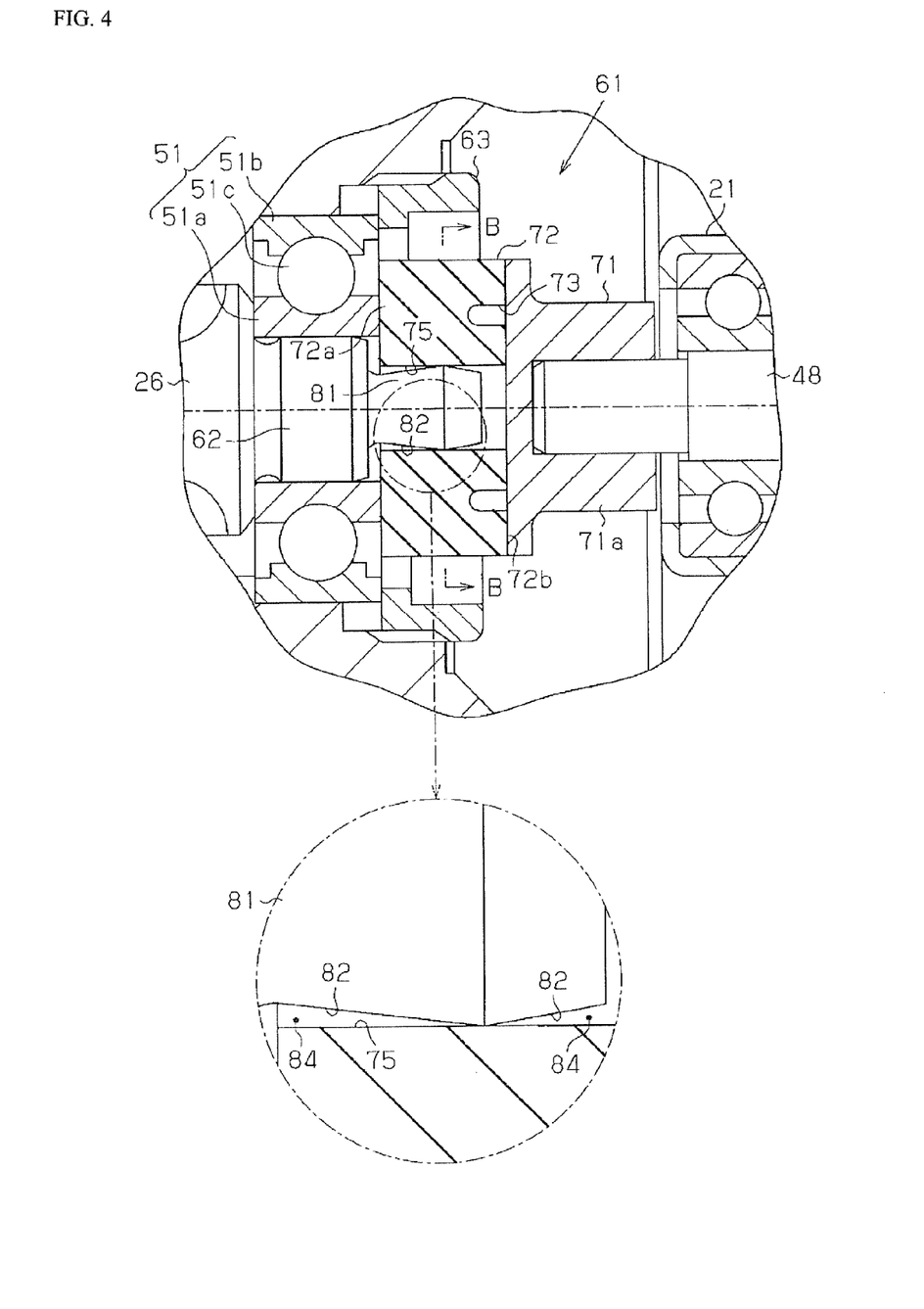
FIG. 4 is an enlarged sectional view that shows a part near a shaft coupling according to the present embodiment.

Next, the coupling structure of the worm gear according to the present embodiment will be described. As shown in FIG. 4, the shaft coupling 61 includes a fixing part 71 and a cylindrical part 72. The fixing part 71 is coupled to the output shaft 48 so as to be integrally rotatable. The cylindrical part 72 is fixed to the fixing part 71. The fixing part 71 is formed in a closed-end cylindrical shape that is open toward the motor 21, and the distal end of the output shaft 48 is press-fitted to the cylindrical part 71a. By so doing, the fixing part 71 is coupled to the output shaft 48 so as to be integrally rotatable. Note that the fixing part 71 is formed of a metal material, such as iron.

The cylindrical part 72 is entirely formed of a rubber-based elastic material. The elastic modulus of the cylindrical part 72 is set to a value such that the cylindrical part 72 substantially does not deform by the outputtable maximum torque (for example, about 5 N) of the motor 21. The cylindrical part 72 is formed such that an opening end part 72a opposite in the axial direction with respect to the motor 21 presses the inner ring 51a of the first rolling bearing 51 toward the axially distal end side of the worm gear 26. A cavity-shaped lightening part 73 is formed in the cylindrical part 72 between the opposite faces of the fixing part 71 and the inner ring 51a of the first rolling bearing 51 in the cylindrical part 72, that is, on a line that passes through the inner ring 51a of the first rolling bearing 51 and the fixing part 71 and that is parallel to the cylindrical part 72. The lightening part 73 is formed in a groove shape so as to open at a bonding face 72b of the cylindrical part 72 with the fixing part 71, and is formed in an annular shape such that the lightening part 73 is arranged coaxially with the first rolling bearing 51.

The cylindrical part 72 is fixed to the fixing part 71 by vulcanization adhesion, by which adhesion is performed in synchronization with vulcanization of an elastic element, such that the cylindrical part 72 is arranged coaxially with the output shaft 48. In addition, the lightening part 73 is formed in the cylindrical part in advance before the cylindrical part 72 is bonded to the fixing part 71 by vulcanization adhesion (in an unvulcanized state).

Figure 5:
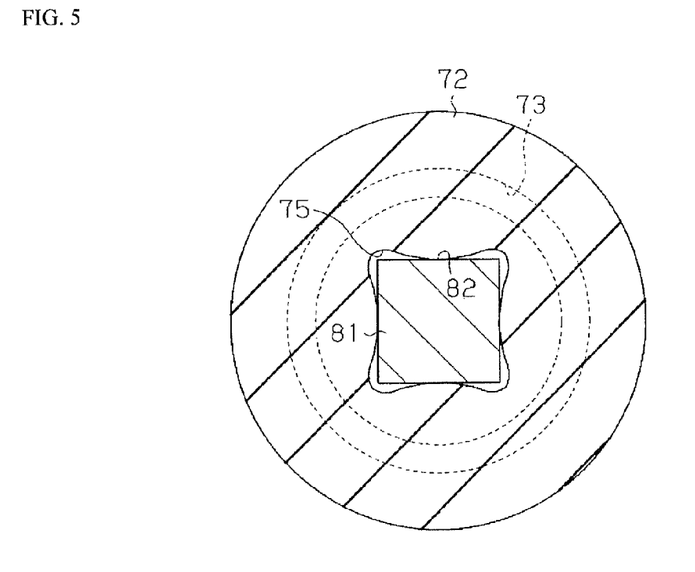
FIG. 5 is a sectional view taken along the line B-B in FIG. 4.

An inner periphery 75 of the cylindrical part 72 is formed parallel to its axis, and, as shown in FIG. 5, a cross section perpendicular to the axis is formed in a substantially rectangular shape. Note that, in the present embodiment, the top parts of the inner periphery 75 each are formed in an arcuate shape so as to allow the worm gear 26 to be smoothly tiltable in all the directions in the circumferential direction.

As shown in FIG. 4, a coupling part 81 is formed at the proximal end part 62 of the worm gear 26. The coupling part 81 protrudes toward the motor 21 (right side in FIG. 4) in the axial direction, and is inserted in the cylindrical part 72.

As shown in FIG. 5, an outer periphery 82 of the coupling part 81 is formed in a rectangular shape in cross section such that a cross section perpendicular to the axis of the coupling part 81 is engageable with the inner periphery 75 in the circumferential direction.

As shown in FIG. 4, the outer periphery 82 is ridged such that gaps 84 that allow the coupling part 81 to tilt inside the cylindrical part 72 are provided inside the cylindrical part 72, that is, a substantially middle in the axial direction protrudes radially outward. In other words, the outer periphery 82 is formed such that the coupling part 81 tapers from a substantially middle in the axial direction toward the motor 21 and the coupling part 81 tapers toward the proximal end part 62 (left side in FIG. 4) of the worm gear 26. Then, the outer periphery 82 is inclined with respect to the inner periphery 75 so as to distance from the inner periphery 75. By so doing, the gaps 84 that allow the coupling part 81 to tilt inside the cylindrical part 72 are provided.

Figure 6:
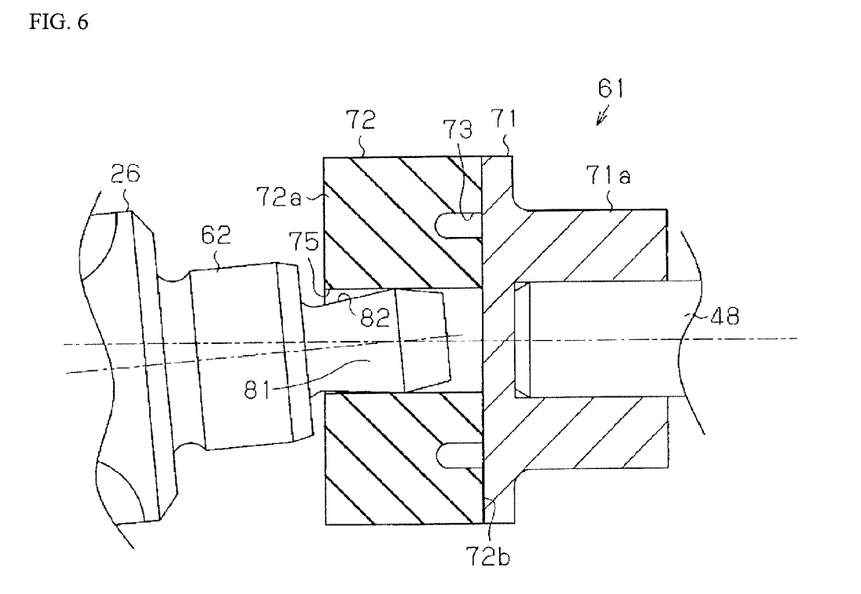
FIG. 6 is a schematic view that shows a state where a coupling part of a worm gear is tilted.

Thus, as shown in FIG. 6, the coupling part 81 is tiltable in the counterclockwise direction in the drawing, the worm gear 26 tilts about its proximal end side, and the optimal center distance is kept at the meshing parts of the worm gear 26 and the wheel gear 25. In addition, the outer periphery 82 of the coupling part 81 engages the inner periphery 75 of the cylindrical part 72. By so doing, the torque of the motor 21 is transmitted to the worm gear 26 via the shaft coupling 61.

As described above, according to the present embodiment, the following useful advantageous effects are obtained.

1) The EPS 1 includes the shaft coupling 61 that drivably couples the worm gear 26 to the output shaft 48 of the motor 21 such that the worm gear 26 is tiltable with respect to the output shaft 48, and the shaft coupling 61 has the fixing part 71 coupled to the output shaft 48 so as to be integrally rotatable and the cylindrical part 72 having the inner periphery 75 formed in a substantially rectangular shape in cross section and fixed to the fixing part 71. On the other hand, the coupling part 81 having the outer periphery 82 in non-circular cross section, inserted in the cylindrical part 72 and engageable with the inner periphery 75 in the circumferential direction, is formed at the proximal end part 62 of the worm gear 26, and the outer periphery 82 is ridged such that the gaps 84 that allow the coupling part 81 to tilt are provided inside the cylindrical part 72. Then, the cylindrical part 72 presses the inner ring 51a of the first rolling bearing 51 toward the axially distal end side of the worm gear 26.

With the above configuration, the outer periphery 82 of the coupling part 81 is ridged such that the gaps 84 that allow the proximal end part 62 to tilt are provided inside the cylindrical part 72, so the worm gear 26 is able to tilt with respect to the output shaft 48 through the shaft coupling 61, and it is possible to keep the optimal center distance between the worm gear 26 and the wheel gear 25. In addition, the inner ring 51a of the first rolling bearing 51 is pressed toward the axially distal end side of the worm gear 26 by the cylindrical part 72. By so doing, the internal gap of the first rolling bearing 51 is filled, so it is possible to suppress generation of noise. Then, because the cylindrical part 72 is fixed to the fixing part 71 and the shaft coupling 61 is formed as one component, in comparison with the case where a shaft coupling is formed of a plurality of components that are separated in a state before assembling as in the case of the conventional art, the shaft coupling 61 may be formed with a simple configuration, and it is possible to improve its assemblability.

2) The cylindrical part 72 is formed of an elastic material. Here, significantly large torque may act from the wheel gear 25 on the worm gear 26 through application of reverse input, for example, a collision of the steered wheel 12 of the vehicle with a curb. However, the worm gear 26 cannot immediately rotate due to the inertia (inertia) of the motor 21, so there is a possibility that a large load acts on the meshing part with the wheel gear 25 through application of reverse input. In terms of this point, with the above configuration, the cylindrical part 72 is formed of an elastic material, so, even when significantly large torque acts from the wheel gear 25 on the worm gear 26 through application of reverse input, the cylindrical part 72 elastically deforms so as to twist. By so doing, it is possible to suppress large torque that acts on the meshing part with the wheel gear 25.

3) The cavity-shaped lightening part 73 is formed in the cylindrical part 72 between the opposite faces of the fixing part 71 and the inner ring 51a of the first rolling bearing 51 in the cylindrical part 72. When the elastic modulus of the elastic material that forms the cylindrical part 72 is high, a preload on the inner ring 51a of the first rolling bearing 51 significantly varies depending on the assembling accuracy, or the like, of the shaft coupling 61, so it is desirable to decrease the elastic modulus in view of adjusting the preload. On the other hand, when the elastic modulus is low, there is a possibility that the cylindrical part 72 is elastically deformed by torque transmitted from the output shaft 48 of the motor 21 to the worm gear 26, and there occurs a problem, such as a delay of torque transmission, so it is desirable to increase the elastic modulus in view of torque transmission. In terms of this point, with the above configuration, the cavity-shaped lightening part 73 is formed in the cylindrical part 72, so the cylindrical part 72 easily deforms along the axial direction, and it is possible to easily adjust the preload. Thus, even when a material having a high elastic modulus is used for the cylindrical part 72, it is possible to easily adjust the preload, so it is possible to suppress a delay of torque transmission.

4) Because the lightening part 73 is formed in a groove shape that is open at the bonding face 72b of the cylindrical part 72 with the fixing part 71, in comparison with the case where the lightening part 73 is formed in a groove shape that is open to the outer periphery of the cylindrical part 72, it is possible not to reduce the thickness of the cylindrical part 72. Thus, easy twisting of the cylindrical part 72 is suppressed by forming the lightening part 73, so it is possible to suppress a delay of torque transmission.

5) Because the lightening part 73 is formed in an annular shape so as to be arranged coaxially with the first rolling bearing 51, it is possible to press the inner ring 51a uniformly in the circumferential direction. Note that the above described embodiment may be implemented in the following embodiments modified as needed from the above described embodiment.

In the above embodiment, the outer periphery 82 of the coupling part 81 directly engages the inner periphery 75 of the cylindrical part 72. However, it is not limited to this configuration. For example, as shown in FIG. 7(a) and FIG. 7(b), it is applicable that a substantially rectangular reinforcement part 91 that is in plane contact with the inner periphery 75 of the cylindrical part 72 and that is engageable with the outer periphery 82 of the coupling part 81 in the circumferential direction is provided and the outer periphery 82 engages the inner periphery 75 via the reinforcement part 91. The reinforcement part 91 is formed of a resin material that has a higher elastic modulus and lower friction characteristic than the cylindrical part 72, and is fixed by being press-fitted into the cylindrical part 72. With the above configuration, it is possible to obtain advantageous effects similar to 1) to 5) of the above embodiment.

Figure 7:
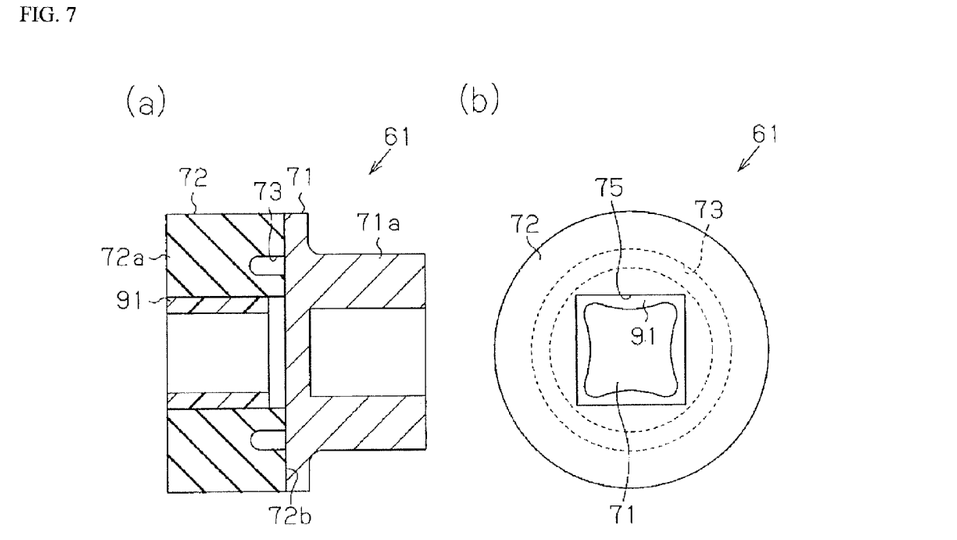
FIG. 7(a) is a sectional view taken along the axial direction of another shaft coupling.
FIG. 7(b) is a side view when the other shaft coupling is viewed from a worm gear side.

Because the outer periphery 82 of the coupling part 81 is ridged, the outer periphery 82 is in line contact with the inner periphery 75 of the cylindrical part 72. Thus, when the outer periphery 82 directly engages the inner periphery 75, large force locally acts from the outer periphery 82 of the coupling part 81 on the inner periphery 75 when the torque of the motor 21 is transmitted. By so doing, the cylindrical part 72 easily deforms, and there is a possibility that a delay of torque transmission slightly occurs. In terms of this point, with the configuration shown in. FIG. 7, because the reinforcement part 91 is formed of a resin material having a higher elastic modulus than the cylindrical part 72, the reinforcement part 91 is hard to deform when the torque of the motor 21 is transmitted. In addition, because the reinforcement part 91 is in plane contact with the inner periphery 75 of the cylindrical part 72, large force does not act on the inner periphery 75, so the cylindrical part 72 is hard to deform, and it is possible to suppress occurrence of a delay of torque transmission.

Figure 8:
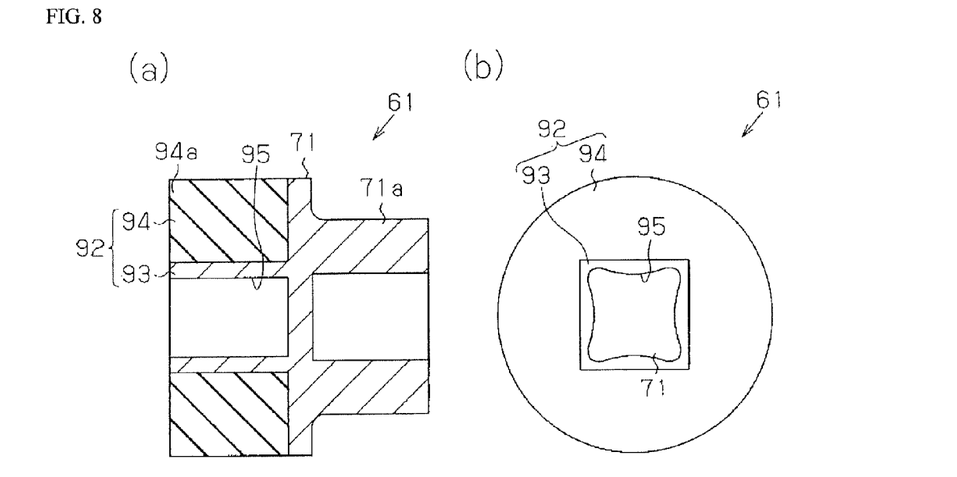
FIG. 8(a) is a sectional view taken along the axial direction of another shaft coupling.
FIG. 8(b) is a side view when the other shaft coupling is viewed from a worm gear side.

In the above embodiment, the entire cylindrical part 72 is formed of an elastic material; however, it is not limited to this configuration. For example, as shown in FIG. 8, it is applicable that part of the cylindrical part 72 is formed of a metal material and is formed integrally with the fixing part 71. Specifically, the cylindrical part 92 is formed of an inner peripheral part 93 made of a metal material and an outer peripheral part 94 made of an elastic material. The inner peripheral part 93 is formed integrally with the fixing part 71, and the inner periphery 95 is formed as in the case of the inner periphery 75 according to the above described embodiment. In addition, an opening end part 94a opposite to the motor 21 in the axial direction of the outer peripheral part 94 presses the inner ring 51a of the first rolling bearing 51 toward the axially distal end side of the worm gear 26. Note that the outer peripheral part 94 is made of an elastic material having a low elastic modulus and the lightening part 73 is not formed. With the above configuration, in addition to a functional effect similar to (1) of the first embodiment, because the inner peripheral part 93 of the cylindrical part 92 and the fixing part 71 are integrally formed of a metal material, it is possible to transmit the torque of the motor 21 to the worm gear 26 without delay. Note that, in this configuration, a resin layer having a low friction characteristic may be coated on the inner periphery 95.

In the above embodiment, the lightening part 73 is formed in a groove shape that is open at the bonding face 72b of the cylindrical part 72; however, it is not limited to this configuration. For example, it is applicable that the lightening part 73 is formed in a groove shape that is open at the outer periphery of the, cylindrical part 72. In the above embodiment, the lightening part 73 is formed in an annular shape so as to be arranged coaxially with the first rolling bearing; instead, the lightening part 73 may not be formed in an annular shape but may be divided into multiple parts in the circumferential direction.

In the above embodiment, the lightening part 73 is formed in the cylindrical part 72; however, it is not limited to this configuration. The lightening part 73 does not need to be formed in the cylindrical part 72. In the above embodiment, the urging means is formed of the curved leaf spring 66 that is curved in an arcuate shape so as to surround the outer periphery of the second rolling bearing 52; however, it is not limited to this configuration. As long as it is possible to urge the second rolling bearing 52 such that the second rolling bearing 52 gets close to the wheel gear 25, the urging means may be, for example, formed of another member, such as a coil spring.

In the above embodiment, the inner periphery 75 of the cylindrical part 72 and the outer periphery 82 of the coupling part 81 are formed in a substantially rectangular shape in cross section; however, it is not limited to this configuration. As long as the cylindrical part 72 engages the coupling part 81 in the circumferential direction, the inner periphery 75 and the outer periphery 82 may be, for example, formed in any sectional shape, such as another polygonal shape, such as a substantially triangular shape in cross section, and a semicircular columnar shape in cross section.

In the above embodiment, the inner periphery 75 of the cylindrical part 72 is formed parallel to the axis, and the outer periphery 82 of the coupling part 81 is ridged. By so doing, the gaps 84 that allow the coupling part 81 to tilt inside the cylindrical part 72 are formed. However, it is not limited to this configuration. It is applicable that, the outer periphery 82 of the coupling part 81 is formed parallel to the axis and the inner periphery 75 of the cylindrical part 72 is ridged and, by so doing, gaps that allow the coupling part 81 to tilt inside the cylindrical part 72 are formed.

In addition, when gaps that allow the coupling part 81 to tilt inside the cylindrical part 72 are formed, the inner periphery 75 or the outer periphery 82 does not need to be formed parallel to the corresponding axis. In the above embodiment, the invention is embodied as the so-called column-type EPS 1. However, as long as the motor 21 is drivably coupled to the steering shaft 3 via the speed reducing mechanism 24 formed such that the worm gear 26 is meshed with the wheel gear 25, the invention may be, for example, applied to a so-called pinion-type EPS that applies assist force to the pinion shaft 10.

INDUSTRIAL APPLICABILITY

The invention is applicable to an electric power steering system that transmits driving force to a steering shaft via a speed reducing mechanism with the use of an actuator, such as a motor, as a driving source.

DESCRIPTION OF REFERENCE NUMERALS

1 electric power steering system (EPS)
3 steering shaft
21 motor
24 speed reducing mechanism
25 wheel gear
26 worm gear
48 output shaft
51 first rolling bearing
51a, 52a inner ring
52 second rolling bearing
61 shaft coupling
62 proximal end part
64 distal end part
71 fixing part
72, 92 cylindrical part
72a, 92a opening end part
72b bonding face
73 lightening part
75, 95 inner periphery
81 coupling part
82 outer periphery
84 gap
91 reinforcement part
93 inner peripheral part
94 outer peripheral part

The invention claimed is:

1. An electric power steering system that includes a motor that applies assist force for assisting steering operation to a steering system; a speed reducing mechanism that is formed such that a worm gear to be rotated by the motor is meshed with a wheel gear coupled to the steering shaft; and a shaft coupling that drivably couples the worm gear to an output shaft of the motor such that the worm gear is tiltable with respect to the output shaft, wherein a proximal end part of the worm gear, adjacent to the motor, is supported by a first rolling bearing, a distal end part of the worm gear is supported by a second rolling bearing that is provided so as to be movable in a direction to approach to or distance from the wheel gear, and the second rolling bearing is urged by urging means so as to get close to the wheel gear, wherein:

the shaft coupling includes a fixing part coupled to the output shaft so as to be integrally rotatable and a cylindrical part having an inner periphery in non-circular cross section and fixed to the fixing part, a coupling part having an outer periphery in non-circular cross section, the outer periphery being inserted in the cylindrical part and being engageable with the inner periphery in a circumferential direction, is formed in the proximal end part, any one of the inner periphery and the outer periphery is ridged such that a gap that allows the coupling part to tilt is provided inside the cylindrical part, and the cylindrical part presses an inner ring of the first rolling bearing toward an axially distal end side of the worm gear.

2. The electric power steering system according to claim 1, wherein
the cylindrical part is formed of an elastic material.

3. The electric power steering system according to claim 2, wherein
a cavity-shaped lightening part is formed in the cylindrical part between opposite faces of the fixing part and the inner ring of the first rolling bearing in the cylindrical part.

4. The electric power steering system according to claim 3, wherein
the lightening part is formed in a groove shape that is open at a bonding face of the cylindrical part with the fixing part.

5. The electric power steering system according to claim 2, wherein
a reinforcement part that is in plane contact with the inner periphery and that is engageable with the outer periphery in the circumferential direction is provided at the cylindrical part, and
the reinforcement part is made of a resin material having a higher elastic modulus than the cylindrical part.

6. The electric power steering system according to claim 1, wherein
the cylindrical part includes an inner peripheral part made of a metal material and having the inner periphery in non-circular cross section and an outer peripheral part made of an elastic material and pressing the inner ring of the first rolling bearing toward the axially distal end side of the worm gear, and
the fixing part is made of a metal material and is integrally formed with the inner peripheral part.

* * * * *